US011016709B2

(12) United States Patent
Takasawa et al.

(10) Patent No.: US 11,016,709 B2
(45) Date of Patent: May 25, 2021

(54) PRINTING APPARATUS AND CONTROL METHOD OF PRINTING APPARATUS

(71) Applicant: SEIKO EPSON CORPORATION, Tokyo (JP)

(72) Inventors: Jun Takasawa, Matsumoto (JP); Hirotaka Akamatsu, Matsumoto (JP); Yasuhiro Oshima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/856,807

(22) Filed: Apr. 23, 2020

(65) Prior Publication Data
US 2020/0341701 A1 Oct. 29, 2020

(30) Foreign Application Priority Data

Apr. 26, 2019 (JP) .............................. JP2019-085268

(51) Int. Cl.
*G06F 3/12* (2006.01)

(52) U.S. Cl.
CPC ............ *G06F 3/1221* (2013.01); *G06F 3/122* (2013.01); *G06F 3/1224* (2013.01); *G06F 3/1288* (2013.01)

(58) Field of Classification Search
CPC .... G06F 3/1221; G06F 3/1288; G06F 3/1224; G06F 3/122
See application file for complete search history.

(56) References Cited

U.S. PATENT DOCUMENTS

| 6,895,196 | B2 * | 5/2005 | Uchizono | .......... | G03G 15/5004 399/75 |
|---|---|---|---|---|---|
| 8,635,479 | B2 * | 1/2014 | Soga | .................. | G03G 15/5083 713/323 |
| 2006/0100724 | A1 * | 5/2006 | Miura | ................ | H04N 1/00209 700/82 |
| 2009/0313493 | A1 * | 12/2009 | Ide | .......................... | G06F 1/325 713/323 |
| 2010/0069127 | A1 * | 3/2010 | Fiennes | ............. | H04W 52/0264 455/574 |
| 2011/0019225 | A1 * | 1/2011 | Jung | .................. | G03G 15/5087 358/1.15 |
| 2011/0255010 | A1 * | 10/2011 | Sakai | ............... | H04N 21/42222 348/730 |
| 2014/0173315 | A1 * | 6/2014 | Yokoyama | ......... | H04N 1/00411 713/323 |

(Continued)

FOREIGN PATENT DOCUMENTS

JP   2015-050736   3/2015

*Primary Examiner* — Ted W Barnes
(74) *Attorney, Agent, or Firm* — Workman Nydegger

(57) ABSTRACT

The multifunction machine includes a first CPU core that performs an operation in a normal mode and suspends an operation in an energy saving mode, a second CPU core that performs an operation in the energy saving mode, and a storage unit that stores time information for determining a timing of performing a keep-alive process, wherein the first CPU core causes the operation mode to transition to the normal mode when acquiring a normal mode transition instruction from the second CPU core in the energy saving mode, and then, performs a keep-alive process for the remote operation server, and wherein the second CPU core gives the normal mode transition instruction to the first CPU core based on the time information in the energy saving mode.

5 Claims, 6 Drawing Sheets

(56) References Cited

U.S. PATENT DOCUMENTS

| | | | | |
|---|---|---|---|---|
| 2015/0248156 A1* | 9/2015 | Haraguchi | ......... | G03G 15/5016 713/323 |
| 2015/0261168 A1* | 9/2015 | Yokoyama | ............ | G06F 1/3265 399/81 |
| 2016/0373601 A1* | 12/2016 | Kuroishi | ............ | H04N 1/00896 |
| 2020/0229094 A1* | 7/2020 | Fiennes | ................ | H04W 24/08 |

* cited by examiner

PRINTING APPARATUS AND CONTROL METHOD OF PRINTING APPARATUS

The present application is based on, and claims priority from JP Application Serial Number 2019-085268, filed Apr. 26, 2019, the disclosure of which is hereby incorporated by reference herein in its entirety.

BACKGROUND

1. Technical Field

The present disclosure relates to a printing apparatus and a method of controlling the printing apparatus.

2. Related Art

In the related art, for example, as shown in JP-A-2015-50736, it is known that a terminal performs a keep-alive process to maintain a connection with a server. On the other hand, there is known a printing apparatus which can be remotely operated from a server and which can operate by switching between a normal mode and an energy saving mode.

Since the printing apparatus can not perform the keep-alive process in the energy saving mode, it is not possible to cause an operation mode to transition to the energy saving mode when a communication connection with the server is maintained, so that the printing apparatus can not exhibit the energy saving effect.

SUMMARY

According to an aspect of the present disclosure, a printing apparatus includes a first processor that performs an operation in a normal mode and suspends an operation in an energy saving mode, a second processor that performs an operation in the energy saving mode, and a storage unit that stores time information for determining a timing of performing a keep-alive process for a server, wherein the first processor causes an operation mode to transition to the energy saving mode when an energy saving mode transition condition is satisfied in the normal mode and gives an energy saving mode transition instruction to the second processor, and causes the operation mode to transition to the normal mode when acquiring a normal mode transition instruction from the second processor in the energy saving mode, and then, performs a keep-alive process for the server, and wherein the second processor gives the normal mode transition instruction to the first processor based on the time information in the energy saving mode.

According to an aspect of the present disclosure, in a method of controlling a printing apparatus, the printing apparatus includes a first processor that performs an operation in a normal mode and suspends an operation in an energy saving mode, a second processor that performs an operation in the energy saving mode, and a storage unit that stores time information for determining a timing of performing a keep-alive process for a server. The method includes the first processor causing an operation mode to transition to the energy saving mode when an energy saving mode transition condition is satisfied in the normal mode and giving an energy saving mode transition instruction to the second processor, the second processor giving a normal mode transition instruction to the first processor based on the time information in the energy saving mode, and the first processor causing the operation mode to transition to the normal mode when acquiring the normal mode transition instruction from the second processor, and then, performing a keep-alive process for the server.

DESCRIPTION OF EXEMPLARY EMBODIMENTS

Figure 1:
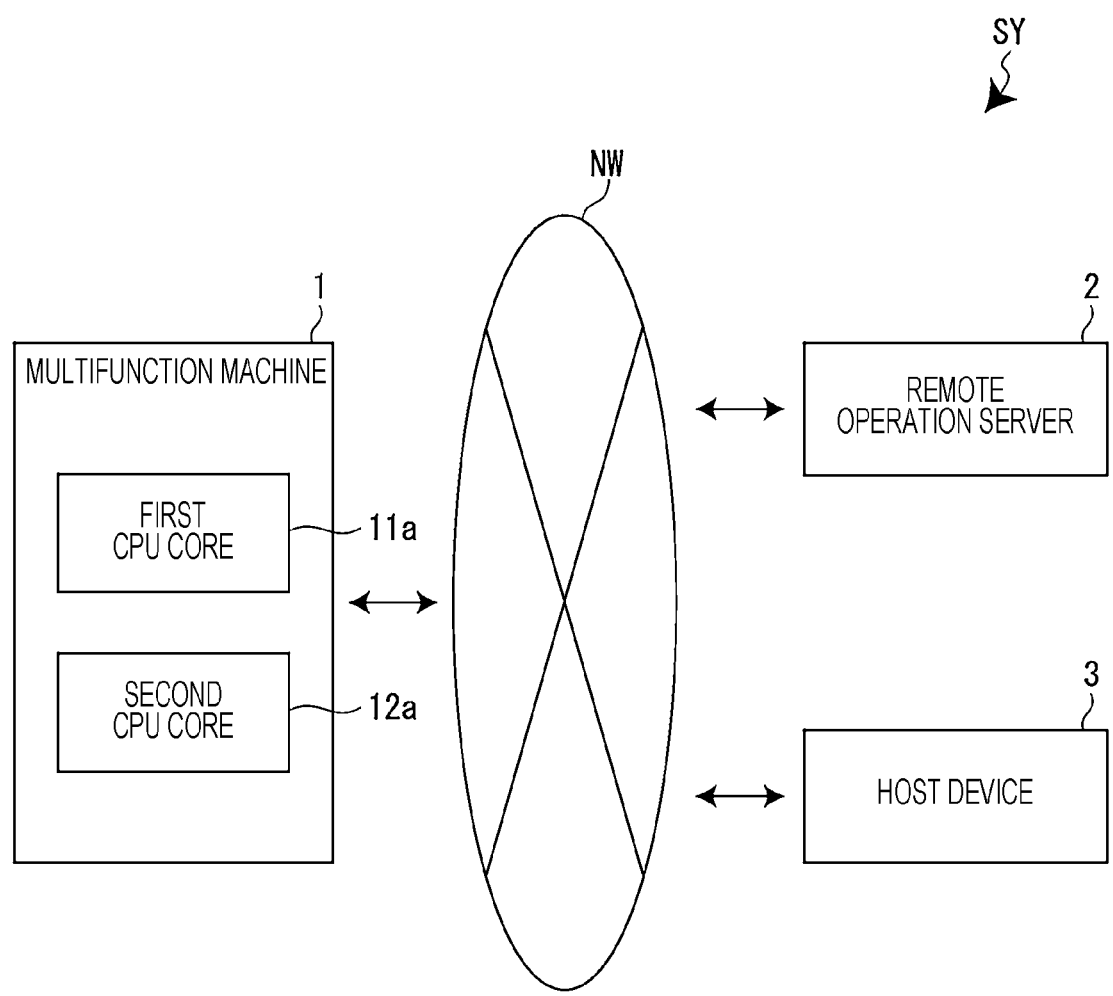
FIG. 1 is a system configuration diagram of a network system.

Hereinafter, a printing apparatus and a method of controlling the printing apparatus according to an embodiment will be described with reference to the accompanying drawings. FIG. 1 is a system configuration diagram of a network system SY including a multifunction machine 1 to which a "printing apparatus" is applied. The network system SY includes the multifunction machine 1, a remote operation server 2, and a host device 3, which are connected via a network NW. The network NW is, for example, an Internet communication network or an in-house local area network (LAN).

A network connecting the multifunction machine 1 and the remote operation server 2 and a network connecting the multifunction machine 1 and the host device 3 do not have to be a common network. They are different networks.

The multifunction machine 1 is a multifunction peripheral (MFP) having a scan function, a print function, a copy function, and the like. The multifunction machine 1 includes a first central processing unit (CPU) core 11a and a second CPU core 12a. The first CPU core 11a is an example of a "first processor", and the second CPU core 12a is an example of a "second processor". Further, the multifunction machine 1 is operable by switching an operation mode between a normal mode and an energy saving mode that consumes less power than the normal mode.

The first CPU core 11a is a processor that mainly provides a network function in the normal mode, performs an operation in the normal mode, and suspends an operation in the energy saving mode. On the other hand, the second CPU core 12a is a processor that mainly provides a network function in the energy saving mode, and operates in both the normal mode and the energy saving mode.

The remote operation server 2 is a server that remotely operates the multifunction machine 1. The remote operation server 2 monitors the state of the multifunction machine 1 and performs control such as restarting the multifunction machine 1 according to the monitoring result. Further, the remote operation server 2 collects various information indicating the usage status of the multifunction machine 1 from the multifunction machine 1. The collected information is used for maintenance of the multifunction machine 1 and a support service by an operator.

The host device 3 causes the multifunction machine 1 to perform printing by transmitting the print data to the multifunction machine 1. Further, the host device 3 receives the scan data scanned by the multifunction machine 1 from the multifunction machine 1. The host device 3 is, for example, an information processing apparatus such as a personal computer (PC) or a tablet device.

Figure 2:
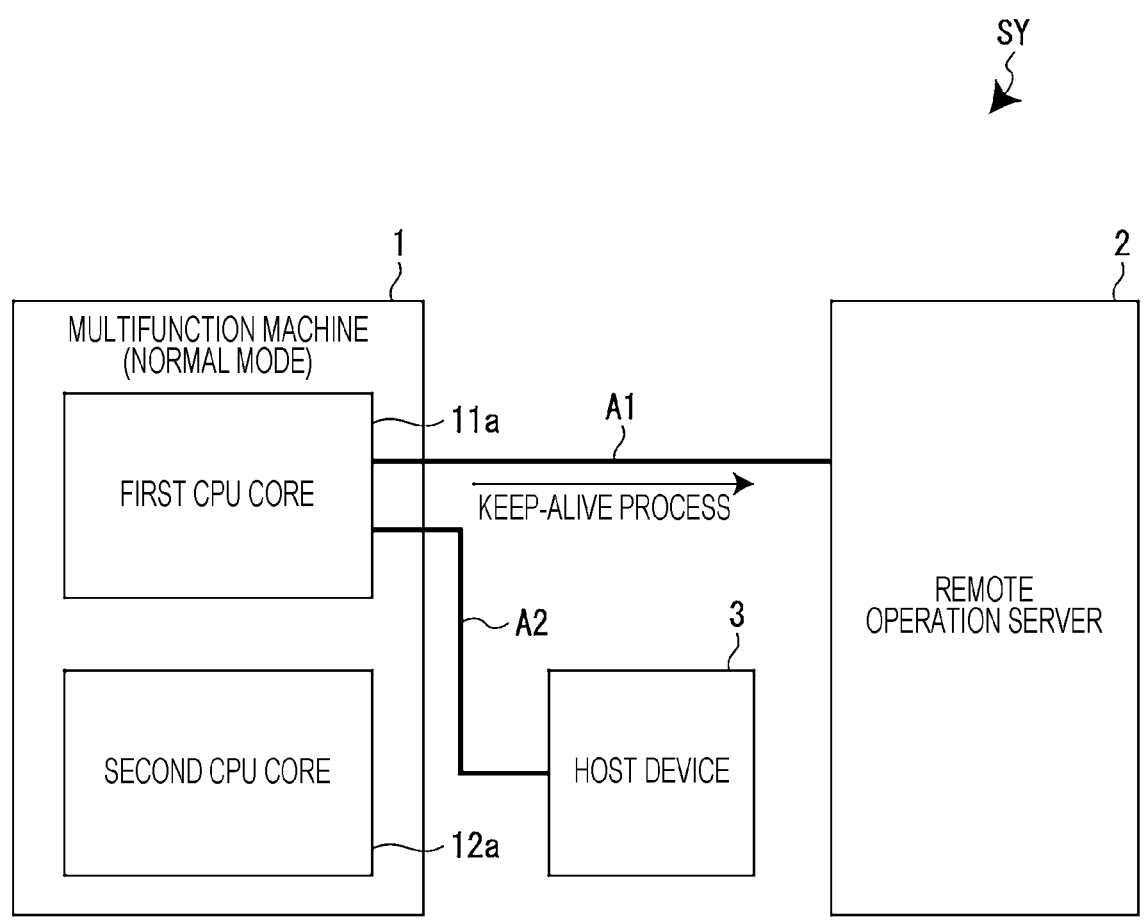
FIG. 2 is a diagram illustrating a communication state of the network system when a multifunction machine is in a normal mode.

FIG. 2 is a diagram illustrating a communication state of the network system SY when the multifunction machine 1 is in the normal mode. When the multifunction machine 1 is in the normal mode, the first CPU core 11a communicates with the multifunction machine 1 via first connection-type communication A1. When the multifunction machine 1 is in the normal mode, the first CPU core 11a performs a keep-alive process for maintaining a network connection with the remote operation server 2 using this first connection-type communication A1. The keep-alive process refers to a process of periodically transmitting simple data in order to maintain a constant connection with a communication destination. In this way, the first CPU core 11a performs the keep-alive process for the remote operation server 2, so that the constant connection between the multifunction machine 1 and the remote operation server 2 is implemented. In this embodiment, the keep-alive process is performed, for example, every 300 seconds.

When the multifunction machine 1 is in the normal mode, the first CPU core 11a communicates with the host device 3 via second connection-type communication A2. For example, when the multifunction machine 1 is in the normal mode, the first CPU core 11a perform communication such as receiving the print data from the host device 3, and transmitting the scan data to the host device 3. For example, a transmission control protocol (TCP), as a communication protocol, is used for the first connection-type communication A1 and the second connection-type communication A2.

Figure 3:
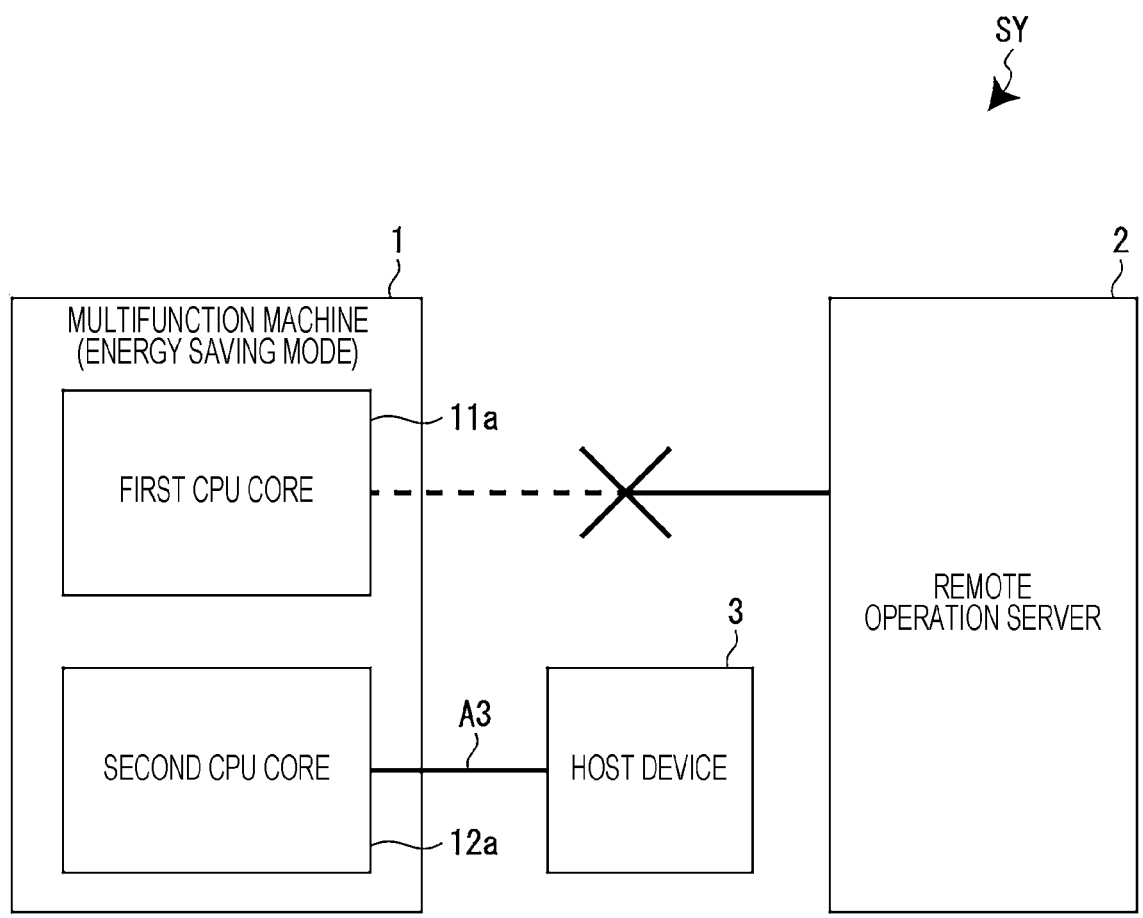
FIG. 3 is a diagram illustrating a communication state of the network system when the multifunction machine is in an energy saving mode.

FIG. 3 is a diagram illustrating a communication state of the network system SY when the multifunction machine 1 is in the energy saving mode. As mentioned above, when the multifunction machine 1 is in the energy saving mode, the second CPU core 12a will operate. The second CPU core 12a has the limited network functions that can be provided because the capacity of the usable memory, that is, a second RAM 12c to be described later, is small in order to increase the power saving effect. For example, connection-type communication can be used in the normal mode, but can not be used in the energy saving mode. For this reason, when the multifunction machine 1 is in the energy saving mode, the multifunction machine 1 can not perform the constant connection with the remote operation server 2, and is disconnected with the remote operation server 2. However, even when the multifunction machine 1 transitions to the energy saving mode, it does not output the disconnection notification to the remote operation server 2, so that the remote operation server 2 assumes a state where the constant connection is maintained.

Also, when the multifunction machine 1 is in the energy saving mode, the second CPU core 12a provides some network services by using the network function that can be used even in the energy saving mode. The network function that can be used even in the energy saving mode is, for example, connectionless-type communication A3. When the multifunction machine 1 is in the energy saving mode, the second CPU core 12a communicates with the host device 3 via the connectionless-type communication A3. For example, a user datagram protocol (UDP), as a communication protocol, is used for the connectionless-type communication A3.

In a case where the multifunction machine 1 is in the energy saving mode, when the second CPU core 12a receives an operation request from the remote operation server 2, or receives, from the host device 3, a request that can not be processed in the energy saving mode, the second CPU core 12a gives the normal mode transition instruction to the first CPU core 11a, and causes a storage unit 13 to be described later to store the received request. The first CPU core 11a causes, based on the normal mode transition instruction acquired from the second CPU core 12a, the operation mode of the multifunction machine 1 to transition from the energy saving mode to the normal mode, and performs the process for the request stored in the storage unit 13.

Further, the multifunction machine 1 may be configured to perform the connectionless-type communication A3 with various devices other than the host device 3 in the energy saving mode.

Figure 4:
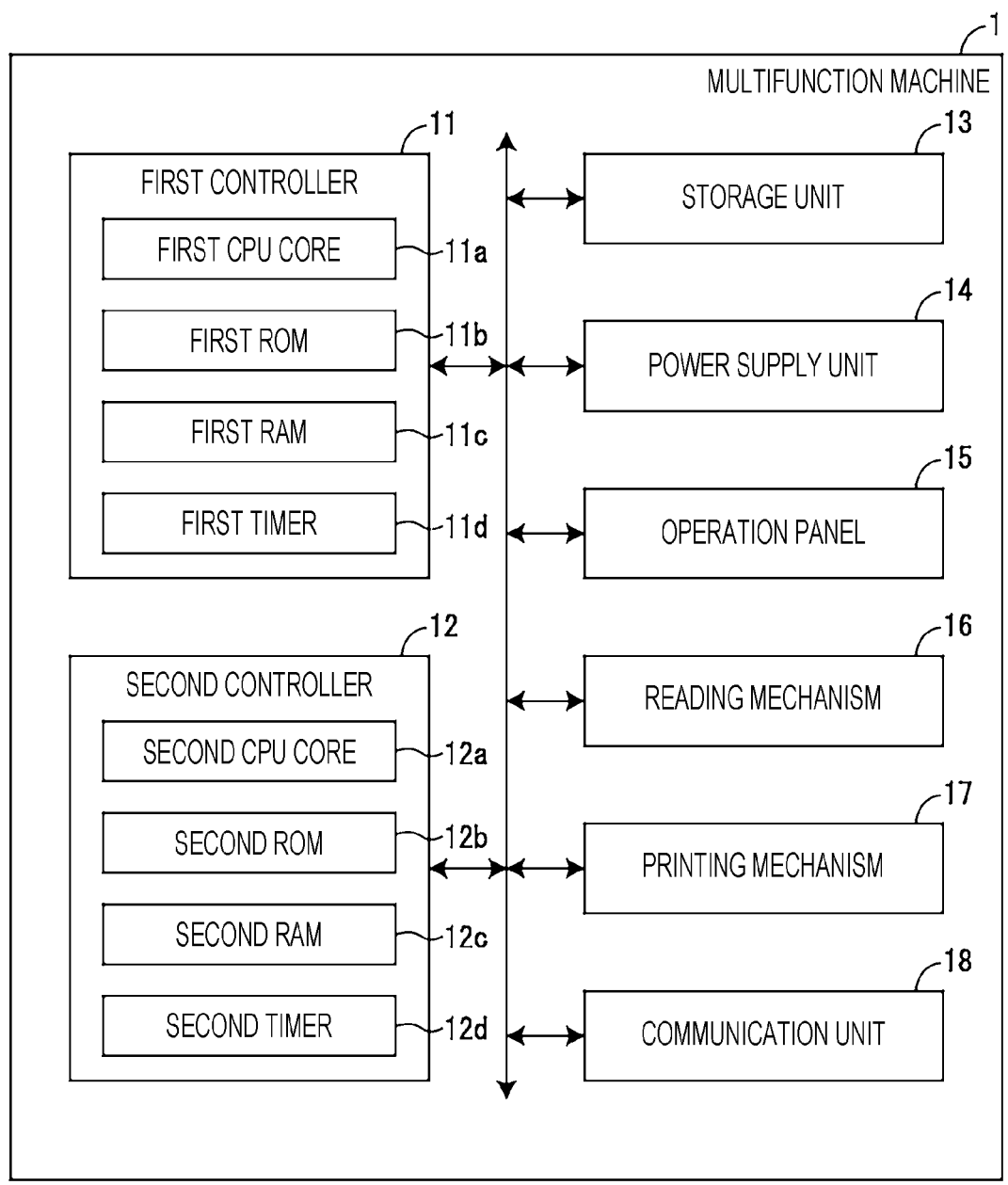
FIG. 4 is a block diagram illustrating a hardware configuration of the multifunction machine.

FIG. 4 is a block diagram illustrating a hardware configuration of the multifunction machine 1. The multifunction machine 1 includes a first controller 11, a second controller 12, a storage unit 13, a power supply unit 14, an operation panel 15, a reading mechanism 16, a printing mechanism 17, and a communication unit 18.

The first controller 11 includes the first CPU core 11a, a first read only memory (ROM) lib, a first random access memory (RAM) 11c, and a first timer 11d. The first CPU core 11a operates as the main processor when the multifunction machine 1 is in the normal mode. Further, the first CPU core 11a controls each unit in the multifunction machine 1 in the normal mode.

The first ROM 11b stores a control program for operating the first CPU core 11a. The first CPU core 11a performs various arithmetic processes by developing the control program stored in the first ROM 11b in the first RAM 11c and executing the control program. The multifunction machine 1 may have a configuration in which the control program for operating the first CPU core 11a is stored in a non-volatile storage medium (not shown) provided outside the first controller 11.

The first RAM 11c is used as a work area of the first CPU core 11a. The first RAM 11c stores connection information for communicating with the remote operation server 2. The first RAM 11c is an example of a "memory". The connection information is a group of information necessary for performing connection-type communication, and, for example, includes a connection transition state, a port number, a sequence number, a timer count value, a maximum transfer size, a buffer pointer, and the like. When the multifunction machine 1 is in the energy saving mode, the first RAM 11c is self-refreshed and keeps retaining the connection information. When the multifunction machine 1 transitions from the energy saving mode to the normal mode, the first CPU core 11a restarts the communication with the remote operation server 2 using the connection information stored in the first RAM 11c.

The first timer 11d measures a remaining time and the like described later.

The second controller 12 includes the second CPU core 12a, a second ROM 12b, the second RAM 12c, and a second timer 12d. When the multifunction machine 1 is in the energy saving mode, the second CPU core 12a operates as the main processor and performs network control and the like. Also, when the multifunction machine 1 is in the normal mode, the second CPU core 12a performs control to assist the first CPU core 11a, such as mechanical control of the reading mechanism 16 and the printing mechanism 17, and the error monitoring process.

The second ROM 12b stores a control program for operating the second CPU core 12a. The second CPU core 12a performs various arithmetic processes by developing the control program stored in the second ROM 12b in the second RAM 12c and executing the control program. The multifunction machine 1 may have a configuration in which the control program for operating the second CPU core 12a is stored in a non-volatile storage medium (not shown) provided outside the second controller 12.

The second RAM 12c is used as a work area of the second CPU core 12a. Further, the second RAM 12c has a smaller storage capacity than the first RAM 11c.

The second timer 12d measures an elapsed time described later and the like.

Instead of the CPU core, a hardware circuit such as an application specific integrated circuit (ASIC), as a processor, may be used for the first controller 11 and the second controller 12. The processor may be configured such that one or more CPU cores and the hardware circuit such as the ASIC operate in cooperation.

The storage unit 13 is a volatile storage medium, and stores information exchanged between the first CPU core 11a and the second CPU core 12a. For example, the storage unit 13 stores time information for determining the execution timing of the keep-alive process for the remote operation server 2. Further, as described above, the storage unit 13 stores the request received from the remote operation server 2 or the host device 3 when the multifunction machine 1 is in the energy saving mode.

The power supply unit 14 supplies power to each unit in the multifunction machine 1. When the operation mode transitions from the normal mode to the energy saving mode, the power supply unit 14 suspends the power supply to the first CPU core 11a, and starts the power supply to the second CPU core 12a in accordance with an instruction from the first CPU core 11a. When the operation mode transitions from the energy saving mode to the normal mode, the power supply unit 14 starts the power supply to the first CPU core 11a in accordance with an instruction from the second CPU core 12a.

The first CPU core 11a causes the operation mode of the multifunction machine 1 to transition from the normal mode to the energy saving mode when the condition for transitioning to the energy saving mode is met. More specifically, when the condition for transitioning to the energy saving mode is met, the first CPU core 11a causes the operation mode to transition from the normal mode to the energy saving mode by suspending the power supply from the power supply unit 14 to the first CPU core 11a after suspending the operations of the operation panel 15, the reading mechanism 16, the printing mechanism 17, and the like, and. Further, in accordance with an instruction from the second CPU core 12a, the first CPU core 11a causes the operation mode of the multifunction machine 1 to transition from the energy saving mode to the normal mode. More specifically, when the power supply to the first CPU core 11a is started, the first CPU core 11a starts the operation of the operation panel 15, the reading mechanism 16, the printing mechanism 17, and the like. As described above, in the multifunction machine 1 of the present embodiment, mainly, the first CPU core 11a switches the operation mode.

The operation panel 15, which is a device in which a touch panel and a display are integrated, presents various information to the user while accepting various operations from the user.

The reading mechanism 16 is a mechanism for reading scan data from a document placed on a reading table. Examples of the reading mechanism 16 includes a light source irradiates the document with light, a lens array that captures light reflected from the document, an image sensor that converts the output of the lens array into an electric signal. The reading mechanism 16 is used for performing a scanning function and a copying function of the multifunction machine 1.

The printing mechanism 17 is a mechanism that performs printing on a print medium such as copy paper. For example, in the ink jet method, the printing mechanism 17 includes an ink jet head, a head drive mechanism for driving the ink jet head, a print medium transport mechanism for transporting a print medium, and the like are included. Further, for example, in the electrophotographic system, the printing mechanism 17 includes a laser light source, a transfer mechanism, a print medium transport mechanism that transports a print medium, and the like. The printing mechanism 17 is used for performing a print function and a copying function of the multifunction machine 1.

The communication unit 18 communicates with the remote operation server 2 and the host device 3 via the network NW. When the multifunction machine 1 is in the normal mode, the communication unit 18 communicates with the remote operation server 2 and the host device 3 using the connection-type communication. When the multifunction machine 1 is in the energy saving mode, the communication unit 18 communicates with the host device 3 using the connectionless-type communication.

When the multifunction machine 1 is in the normal mode, the communication unit 18 can communicate with the host device 3 using the connectionless-type communication.

Figure 5:
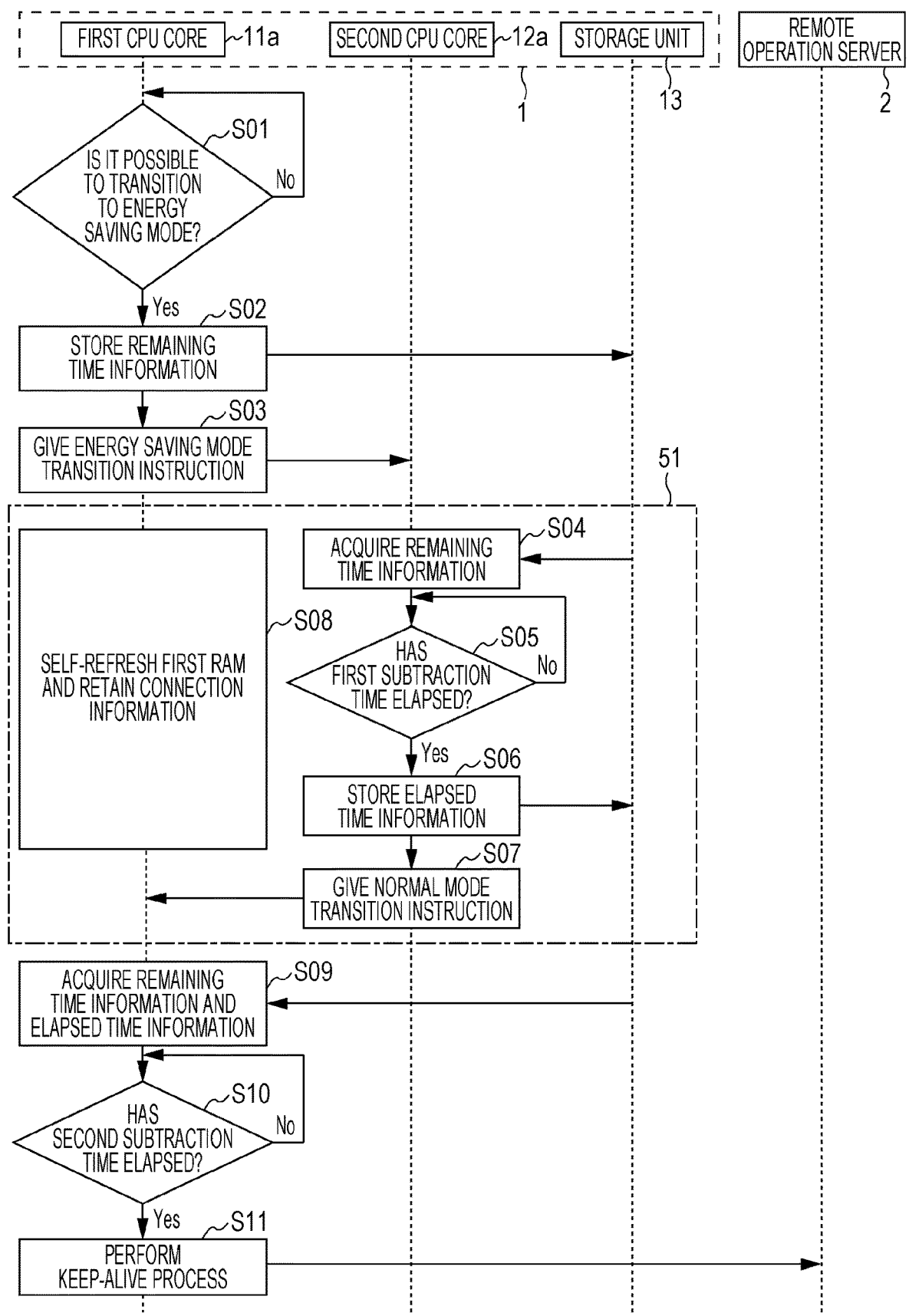
FIG. 5 is a flowchart illustrating a flow of a mode transition process of the multifunction machine.

FIG. 5 is a flowchart illustrating a flow of the mode transition process of the multifunction machine 1. Here, a process of causing the operation mode to transition based on the time information stored in the storage unit 13 will be described. Each step will be described using the first CPU core 11a and the second CPU core 12a as main components.

The first CPU core 11a determines whether it is possible to transition to the energy saving mode (S01). Here, the first CPU core 11a determines whether the multifunction machine 1 is in a state that satisfies the energy saving mode transition condition.

The energy saving mode transition condition includes a condition that the IP address of the multifunction machine 1 has been determined, a condition that a certain period of time has passed since the transmission of the TCP packet or UDP packet, a condition that when a DHCPv4, which is a kind of a dynamic host configuration protocol (DHCP), is valid, 60 or more seconds are remained until the DHCPv4 is updated, a condition that the remaining time until when the next keep-alive process is performed is equal to or longer than a predetermined time described later, and other conditions.

It is assumed that the multifunction machine 1 assigns an IP address using the DHCP. Also, it is assumed that DHCP can be used in the normal mode but can not be used in the energy saving mode. The predetermined time is set longer than the time required for activating the first CPU core 11a, for example, set to 60 seconds.

When the first CPU core 11a determines that it is not possible to transition to the energy saving mode (S01: No), S01 is repeated. When the first CPU core 11a determines that it is possible to transition to the energy saving mode (S01: Yes), the first CPU core 11a causes the storage unit 13 to store the remaining time information indicating the remaining time until when the next keep-alive process is performed (S02). The remaining time information is an example of "time information". Further, the first CPU core 11a gives the energy saving mode transition instruction to the second CPU core 12a (S03). The energy saving mode transition instruction refers to instructing the second CPU core 12a to operate as the main processor.

When the second CPU core 12a acquires the energy saving mode transition instruction from the first CPU core 11a, the second CPU core 12a acquires remaining time information from the storage unit 13 (S04). In addition, the second CPU core 12a determines, based on the measurement of the second timer 12d, whether a first subtraction time which is a time obtained by subtracting the predetermined time from the remaining time based on the remaining time information has elapsed (S05). When determining that the first subtraction time has not elapsed (S05: No), the second CPU core 12a waits until the first subtraction time elapses.

Further, when determining that the first subtraction time has elapsed (S05: Yes), the second CPU core 12a causes the storage unit 13 to store the elapsed time information indicating the elapsed time from when the energy saving mode transition instruction is acquired (S06). Further, immediately after or at the same time when causing the storage unit 13 to store the elapsed time information, the second CPU core 12a gives an normal mode transition instruction to the first CPU core 11a (S07). The normal mode transition instruction refers to instructing the first CPU core 11a to operate as the main processor.

On the other hand, the first RAM 11c used by the first CPU core 11a retains the connection information by self-refreshing when the multifunction machine 1 is in the energy saving mode (S08). S04 to S08 are steps performed when the multifunction machine 1 is in the energy saving mode (see the dashed-dotted line frame 51).

When the first CPU core 11a acquires the normal mode transition instruction from the second CPU core 12a, the first CPU core 11a acquires the remaining time information and the elapsed time information from the storage unit 13 (S09). In addition, after acquiring the normal mode transition instruction, the first CPU core 11a determines, based on the measurement of the first timer 11d, whether a second subtraction time which is a time obtained by subtracting the elapsed time based on the elapsed time information from the remaining time based on the remaining time information has elapsed (S10). The second subtraction time is the above-described predetermined time when no time lag occurs in the steps from S04 to S07 of the second CPU core 12a. When determining that the second subtraction time has not elapsed (S10: No), the first CPU core 11a waits until the second subtraction time elapses. When determining that the second subtraction time has elapsed (S10: Yes), the first CPU core 11a performs a keep-alive process for the remote operation server 2 (S11).

As explained above, in the multifunction machine 1 according to the present embodiment, the second CPU core 12a that operates in the energy saving mode gives a normal mode transition instruction to the first CPU core 11a based on the remaining time information, and the first CPU core 11a that operates in the normal mode transition causes the operation mode to transition to the normal mode in accordance with the normal mode transition instruction from the second CPU core 12a and then, performs a keep-alive process for the remote operation server 2. With this configuration, the multifunction machine 1 can operate in the energy saving mode from the previous keep-alive process to the next keep-alive process, so that the energy saving effect can be expected.

In the normal mode, when the energy saving mode transition condition is satisfied, the first CPU core 11a causes the operation mode to transition to the energy saving mode after causing the storage unit 13 to store the remaining time information, so that the next keep-alive process can be performed at the timing determined by the first CPU core 11a, for example, at the performance interval of the keep-alive process performed periodically.

In the energy saving mode, the first CPU core 11a retains the connection information with the first RAM 11c storing the connection information for communicating with the remote operation server 2 self-refreshed, and causes the operation mode to transition from the energy saving mode to the normal mode, and then performs the keep-alive process for the remote operation server 2 using the connection information, so that communication with the remote operation server 2 can be appropriately resumed.

Regardless of the above embodiment, the following modifications can be used.

First Modification

Figure 6:
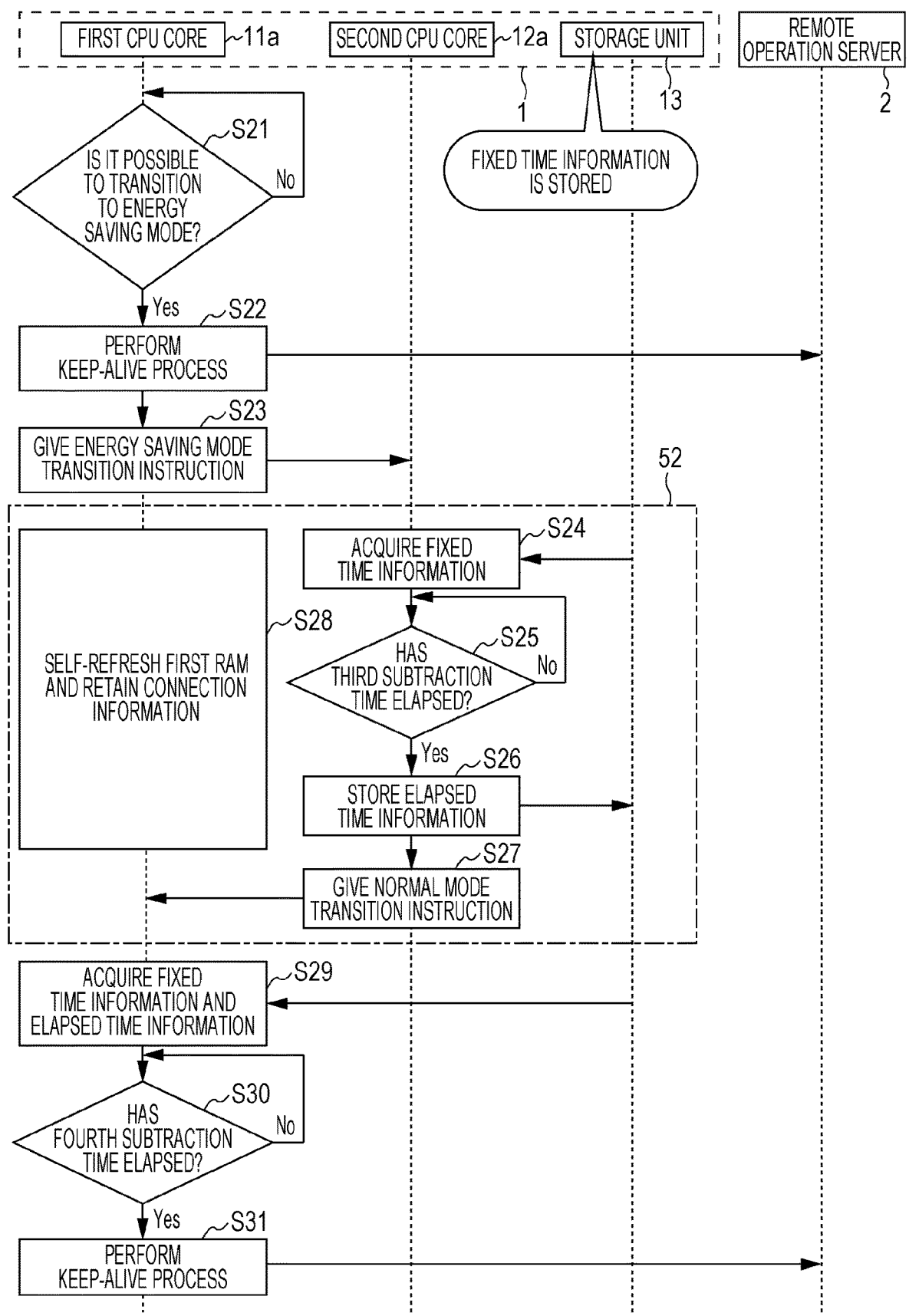
FIG. 6 is a flowchart illustrating a flow of a mode transition process of the multifunction machine according to the first modification.

In the above embodiment, the first CPU core 11a causes the storage unit 13 to store the remaining time information before giving the energy saving mode transition instruction (see S02 and S03 in FIG. 5), but may be configured to causes the storage unit 13 not to store the remaining time information. FIG. 6 is a flowchart illustrating a flow of a mode transition process of the multifunction machine 1 according to the first modification. In this modification, it is assumed that information indicating a fixed time is stored in the storage unit 13. Hereinafter, the information indicating the fixed time is referred to as "fixed time information". The fixed time is, for example, a time shorter than an interval at which the keep-alive process is periodically performed. The fixed time information is an example of "time information".

First, the first CPU core 11a determines whether it is possible to transition to the energy saving mode (S21). When it is determined that it is not possible to transition to the energy saving mode (S21: No), S21 is repeated. When the first CPU core 11a determines that it is possible to transition to the energy saving mode (S21: Yes), the first CPU core 11a performs a keep-alive process for the remote operation server 2 (S22), and thereafter, gives an energy saving mode transition instruction to the second CPU core 12a (S23).

When the second CPU core 12a acquires the energy saving mode transition instruction from the first CPU core 11a, the second CPU core 12a acquires the fixed time information from the storage unit 13 (S24). In addition, the second CPU core 12a, based on the measurement of the second timer 12d, determines whether a third subtraction time which is a time obtained by subtracting a predetermined time from the fixed time based on the fixed time information has elapsed (S25). When determining that the third subtraction time has not elapsed (S25: No), the second CPU core 12a waits until the third subtraction time elapses.

When determining that the third subtraction time has elapsed (S25: Yes), the second CPU core 12a causes the storage unit 13 store the elapsed time information indicating the elapsed time from when the energy saving mode transition instruction is acquired (S26). Further, immediately after or at the same time when the second CPU core 12a causes the storage unit 13 to store the elapsed time information, the second CPU core 12a gives an normal mode transition instruction to the first CPU core 11a (S27). On the other hand, the first RAM 11c used by the first CPU core 11a retains the connection information by self-refreshing when the multifunction machine 1 is in the energy saving mode (S28). S24 to S28 are steps performed when the multifunction machine 1 is in the energy saving mode (see the dashed-dotted line frame 52).

When the first CPU core 11a acquires the normal mode transition instruction from the second CPU core 12a, the first CPU core 11a acquires the fixed time information and the elapsed time information from the storage unit 13 (S29). In addition, after acquiring the normal mode transition instruction, the first CPU core 11a determines, based on the measurement of the first timer 11d, whether a fourth subtraction time which is a time obtained by subtracting the elapsed time based on the elapsed time information from the fixed time based on the fixed time information has elapsed (S30). The fourth subtraction time is the above-described predetermined time when no time lag occurs in the steps from S24 to S27 of the second CPU core 12a. When determining that the fourth subtraction time has not elapsed (S30: No), the first CPU core 11a waits until the fourth subtraction time elapses. When determining that the fourth subtraction time has elapsed (S30: Yes), the first CPU core 11a performs a keep-alive process for the remote operation server 2 (S31).

In this way, according to the first modification, in the multifunction machine 1, the fixed time information in the storage unit 13 is stored in advance, and the first CPU core 11a performs the keep-alive process and then, causes the operation mode to transition to the energy saving mode, so that there is no need to causes the storage unit 13 to store the time information before transitioning to the energy saving mode, and the energy saving mode can be maintained for the fixed time.

Second Modification

In the first modification, the configuration may be such that the first CPU core 11a does not acquire the fixed time information from the storage unit 13 in S29 of FIG. 6. In this case, the first CPU core 11a may acquire the fixed time information at a predetermined timing, such as when the multifunction machine 1 is started, and the acquired fixed time information may be stored in the first RAM 11c. Alternatively, the first CPU core 11a may be configured to store the fixed time information in the first ROM 11b.

Third Modification

In S09 of FIG. 5, the configuration may be such that the first CPU core 11a does not acquire the remaining time information from the storage unit 13. In this case, the first CPU core 11a may store the remaining time information in the first RAM 11c.

Fourth Modification

Further, in the first modification, the configuration may be such that the first CPU core 11a does not acquire the elapsed time information in S29 of FIG. 6. In this case, the predetermined time information indicating the predetermined time may be stored in the storage unit 13 in advance, and the first CPU core 11a may acquire the predetermined time information at a predetermined timing such as when the multifunction machine 1 is started. Alternatively, the configuration may be such that the predetermined time information is stored in the first ROM 11b. Similarly, in S09 in FIG. 5, the configuration may be such that the first CPU core 11a does not acquire the elapsed time information.

Fifth Modification

In the above embodiment, after causing the operation mode of the multifunction machine 1 to transition from the normal mode to the energy saving mode, the first CPU core 11a instructs the power supply unit 14 to suspend the power supply to the first CPU core 11a. Instead, the power supply to part of the first CPU core 11a may be suspended, or the clock frequency of the first CPU core 11a may be reduced.

Sixth Modification

In the above embodiment, the second CPU core 12a operates in both the normal mode and the energy saving mode. The second CPU core 12a may operate in energy saving mode and suspend the operation in the normal mode.

Seventh Modification

In the above-described embodiment, the multifunction machine 1 is described as an example. An apparatus having only a print function, that is, a printing apparatus, may be used. Further, other than the printing apparatus, an electronic device that includes two processors and can be remotely operated from the remote operation server 2 may be used.

Eighth Modification

In the above embodiment, the remote operation server 2 collects various information indicating the usage status of the multifunction machine 1 from the multifunction machine 1. In addition to the remote operation server 2, an information collection server that collects various information indicating the usage status of the multifunction machine 1 from the multifunction machine 1 may be provided.

Ninth Modification

Further, a method of performing respective processes of the multifunction machine 1 shown in the above embodiment and each modification, a program for executing the respective processes of the multifunction machine 1, and a computer-readable recording medium storing the program is also included in the scope of the disclosure. Further, a configuration in which the above-described embodiment and respective modifications are combined may be used. In addition, changes can be made as appropriate without departing from the spirit of the disclosure.

APPENDIX

Hereinafter, a printing apparatus and a control method of the printing apparatus will be additionally described. The multifunction machine 1 includes the first CPU core 11a that performs an operation in a normal mode and suspends an operation in an energy saving mode, the second CPU core 12a that performs an operation in the energy saving mode, and the storage unit 13 that stores time information for determining a timing of performing a keep-alive process for the remote operation server 2, wherein the first CPU core 11a causes an operation mode to transition to the energy saving mode when an energy saving mode transition condition is satisfied in the normal mode and gives an energy saving mode transition instruction to the second CPU core 12a, and causes the operation mode to transition to the normal mode when acquiring a normal mode transition instruction from the second CPU core 12a in the energy saving mode, and then, performs a keep-alive process for the remote operation server 2, and wherein the second CPU core 12a gives the normal mode transition instruction to the first CPU core 11a based on the time information in the energy saving mode.

In a method of controlling the multifunction machine 1, the multifunction machine 1 includes the first CPU core 11a that performs an operation in a normal mode and suspends an operation in an energy saving mode, the second CPU core 12a that performs an operation in the energy saving mode, and the storage unit 13 that stores time information for determining a timing of performing a keep-alive process for the remote operation server 2. The method includes the first CPU core 11a causing an operation mode to transition to the energy saving mode when an energy saving mode transition condition is satisfied in the normal mode and giving an energy saving mode transition instruction to the second CPU core 12a, the second CPU core 12a giving a normal mode transition instruction to the first CPU core 11a based on the time information in the energy saving mode, and the first CPU core 11a causing the operation mode to transition to the normal mode when acquiring the normal mode transition instruction from the second CPU core 12a, and then, performing a keep-alive process for the remote operation server 2.

In the multifunction machine 1, the second CPU core 12a that operates in the energy saving mode gives a normal mode transition instruction to the first CPU core 11a based on the time information for determining the execution timing of the keep-alive process, and the first CPU core 11a that operates in the normal mode transition causes the operation mode to transition to the normal mode in accordance with the normal mode transition instruction from the second CPU core 12a and then, performs a keep-alive process for the remote operation server 2. With this configuration, the multifunction machine 1 can operate in the energy saving mode from the previous keep-alive process to the next keep-alive process, so that the energy saving effect can be expected.

In the above-described multifunction machine 1, it is preferable that when the energy saving mode transition condition is satisfied in the normal mode the first CPU core 11a cause the storage unit 13 to store the time information, and then, cause the operation mode to transition to the energy saving mode.

According to this configuration, in the multifunction machine 1, after the first CPU core 11a causes the storage unit 13 to store the time information and then, the first CPU core 11a causes the operation mode to transition to the energy saving mode, so that the next keep-alive process can be performed at an appropriate timing determined by the first CPU core 11a.

In the above-described multifunction machine 1, it is preferable that the storage unit 13 store, as time information, information indicating the fixed time, and when the energy saving mode transition condition is satisfied in the normal mode, the first CPU core 11a perform a keep-alive process for the remote operation server 2 and then, cause the operation mode to transition to the energy saving mode.

According to this configuration, in the multifunction machine 1, the storage unit 13 stores information indicating the fixed time, and the first CPU core 11a performs the keep-alive process and then, causes the operation mode to transition to the energy saving mode, so that there is no need to causes the storage unit 13 to store the time information before transitioning to the energy saving mode, and the energy saving mode can be maintained for the fixed time.

It is preferable that the above-described multifunction machine 1 include the first RAM 11c self-refreshing and retaining connection information for performing communication with the remote operation server 2 in energy saving mode, and the first CPU core 11a cause the operation mode to transition from the energy saving mode to the normal mode and then, perform a keep-alive process for the remote operation server 2 using the connection information.

According to this configuration, the multifunction machine 1 includes the first RAM 11c self-refreshing and retaining connection information in the energy saving mode, the first CPU core 11a causes the operation mode to transition from the energy saving mode to the normal mode and then, performs the keep-alive process for the remote operation server 2 using the connection information, so that communication with the remote operation server 2 can be appropriately resumed.

What is claimed is:

1. A printing apparatus comprising:
   a first processor that performs an operation in a normal mode and suspends an operation in an energy saving mode;
   a second processor that performs an operation in the energy saving mode; and
   a storage unit that stores time information for determining a timing of performing a keep-alive process for a server, wherein
   the first processor
   causes an operation mode to transition to the energy saving mode when an energy saving mode transition condition is satisfied in the normal mode and gives an energy saving mode transition instruction to the second processor, and
   causes the operation mode to transition to the normal mode when acquiring a normal mode transition instruction from the second processor in the energy saving mode, and then, performs the keep-alive process for the server, and wherein
   the second processor
   gives the normal mode transition instruction to the first processor based on the time information in the energy saving mode.

2. The printing apparatus according to claim 1, wherein
   the first processor
   causes the storage unit to store the time information when the energy saving mode transition condition is satisfied in the normal mode, and then, causes the operation mode to transition to the energy saving mode.

3. The printing apparatus according to claim 1, wherein
   the storage unit
   stores information indicating a fixed time as the time information, and wherein
   the first processor
   performs a keep-alive process for the server when an energy saving mode transition condition is satisfied in the normal mode, and then, causes the operation mode to transition to the energy saving mode.

4. The printing apparatus according to claim 1, further comprising:
   a memory self-refreshing and retaining connection information for performing communication with the server in the energy saving mode, and wherein
   the first processor
   causes the operation mode to transition from the energy saving mode to the normal mode and then, performs a keep-alive process for the server using the connection information.

5. A method of controlling a printing apparatus, the printing apparatus including
   a first processor that performs an operation in a normal mode and suspends an operation in an energy saving mode,
   a second processor that performs an operation in the energy saving mode, and
   a storage unit that stores time information for determining a timing of performing a keep-alive process for a server,
   the method comprising:
   the first processor causing an operation mode to transition to the energy saving mode when an energy saving mode transition condition is satisfied in the normal mode and giving an energy saving mode transition instruction to the second processor;

the second processor giving a normal mode transition instruction to the first processor based on the time information in the energy saving mode; and the first processor causing the operation mode to transition to the normal mode when acquiring the normal mode transition instruction from the second processor, and then, performing the keep-alive process for the server.

\* \* \* \* \*